Oct. 7, 1941.                    J. YOUHOUSE                    2,258,561
                                ELECTRIC MOTOR
                            Filed July 18, 1940                3 Sheets-Sheet 2
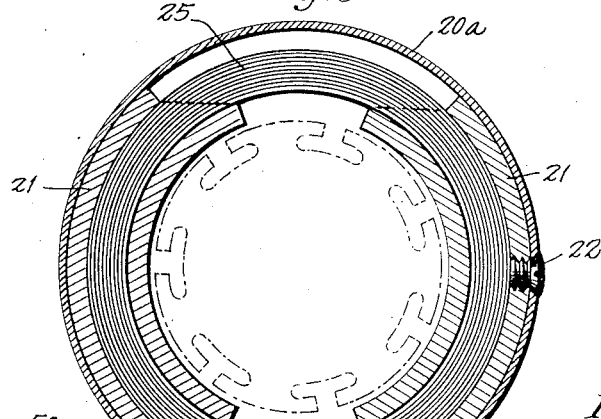
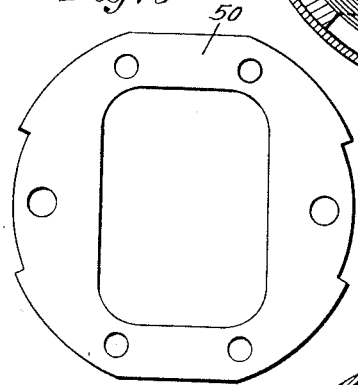
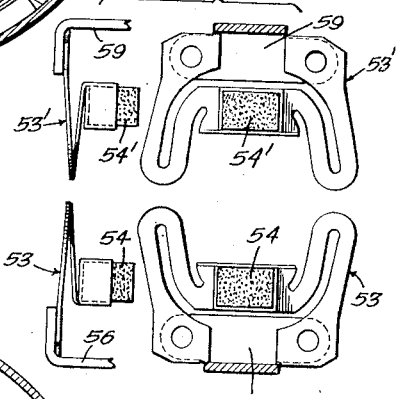
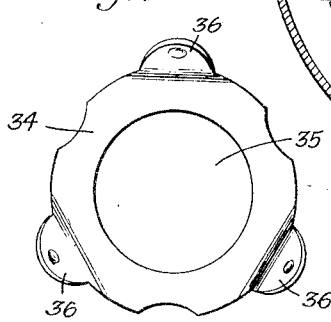
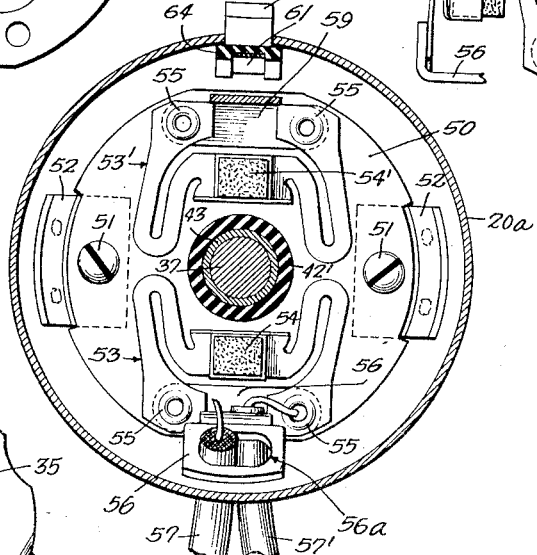
INVENTOR
Joseph Youhouse,
BY Johnson, Kline and Smyth
ATTORNEY

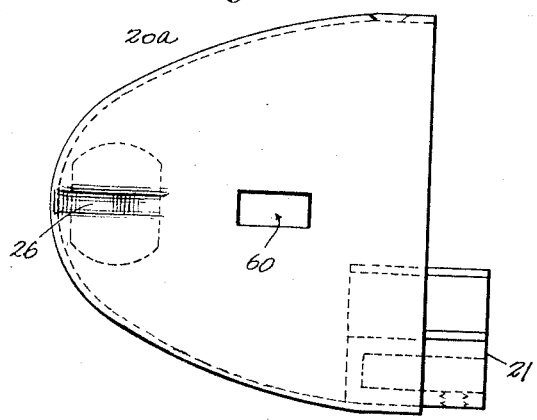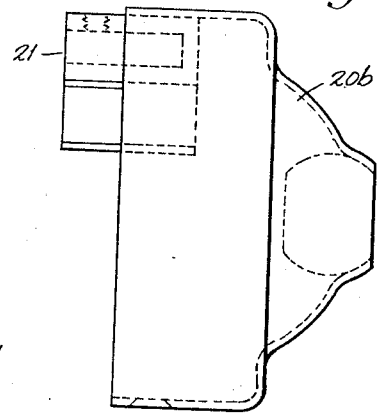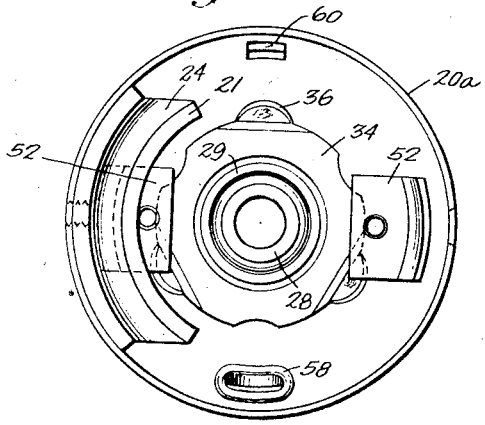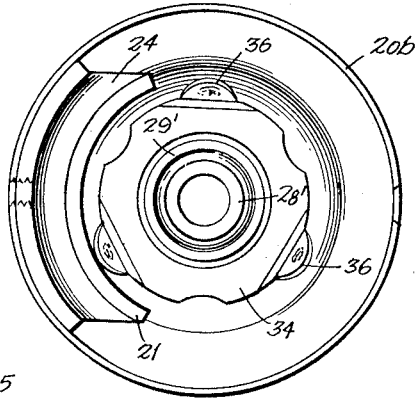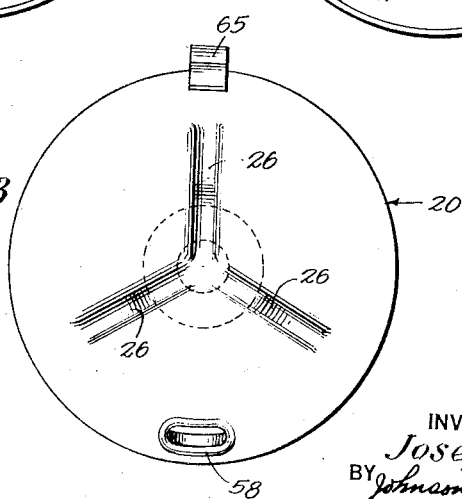

Patented Oct. 7, 1941

2,258,561

UNITED STATES PATENT OFFICE 2,258,561

ELECTRIC MOTOR

Joseph Youhouse, Fairfield, Conn., assignor to Casco Products Corporation, Bridgeport, Conn., a corporation of Connecticut Application July 18, 1940, Serial No. 346,095

14 Claims. (Cl. 172—36)

The present invention relates to electric motors and especially to small electric motors of the direct current type.

Such motors are used particularly for driving auxiliary devices in automotive vehicles such as horns, fans, for heaters, ventilators or defrosters, and similar devices, and may also be used for other purposes such as driving dental or surgical implements, small power tools, etc.

It is an object of the present invention to provide a motor of the aforesaid type of simple, rugged and inexpensive construction, the parts of which may be cheaply manufactured, especially by stamping and molding processes, and which may be economically and conveniently assembled.

When such motors are used for driving fans, it is of material importance that the outer surface of the motor be streamlined to offer a minimum resistance to the flow of air around the motor. Streamlining also improves the appearance of the device.

Accordingly, a further object of the invention is the provision of a motor having a smooth streamlined exterior, and it is also an object to utilize the internal space formed by such streamlining with the greatest economy whereby the size of the motor is reduced to a minimum.

The present invention is shown as applied to a small fan motor of the commutator type suitable for six volt direct current use. However, the invention is not to be limited to this specific type.

Motors of this standard commutator type consist of a rotary member or armature having windings connected to a commutator which is engaged by stationary brushes, the motor being covered by a housing which also carries a salient pole field structure magnetized by field windings. The poles are so disposed around the armature that the magnetization of said poles, acting with the magnetization of the armature, provides a torque for turning the armature.

In prior motor construction of the two-pole type, the field structure comprised a pair of pole pieces carrying separate windings, or a U-shaped yoke carrying a single winding on its transverse portion with the arms of the yoke extending over the armature. The provision of field windings adapted for separate pole pieces, or for a U-shaped yoke complicates the field structure, rendering it relatively inconvenient to assemble, and generally requires irregularly shaped field windings, prefabrication of which is relatively inconvenient.

The objects of the present invention are accomplished in part by the provision of a novel pole structure which is adapted to receive a single field winding formed by a single annular coil, whereby the prefabrication of the coil and its assembly with the pole structure is materially simplified. As an additional feature of the invention, the pole pieces of the novel field structure also serve as means for securing together sections of the motor casing.

In a two-pole motor, the pole pieces are secured to the motor casing on opposite sides of the periphery of the armature and each of the said pole pieces is provided with a lateral arcuate slot into which opposite segments of an annular field coil are inserted. The slots are on opposite sides of the pole pieces, whereby the faces thereof are oppositely magnetized by the current flowing in the field winding. By arranging the pole pieces so that they bridge the line of separation between two parts of the motor casing, the said pole pieces provide means for securing the sections of the motor casing together.

The ordinary type of commutator having a cylindrical contact surface requires brushes radially disposed and having brush holders provided with separate springs for urging the brushes against the commutator surface. This arrangement is not adapted to utilize economically the space provided by a streamlined motor casing.

According to the present invention, a face-type commutator is used, and a novel brush holder having no separate springs is provided which performs the combined functions of holding the brushes, tensioning them against the commutator, and providing an electrical connection therefor, and which may be economically manufactured by simple stamping processes from a piece of resilient sheet metal. The present arrangement of the brush and commutator assembly may be fitted conveniently into the space provided by a streamlined casing, and thus permits a material reduction in the size of the motor.

The motor of the present invention may also include a switch adapted to be operated by a finger piece protruding from the side of the casing, the said switch comprising a single resilient member to maintain the parts of the switch in the desired positions, and to provide a releasable electric contact. A single contact strip of resilient metal maintains the switch in position by urging it against the inner surface of the motor casing and also forms a contactor operated by said switch.

Other features and advantages will hereinafter appear.

Intermediate the washers 38 and 39, the armature shaft 37 carries a wire-wound armature 41 of the usual type supported by the laminated armature core 23. A commutator 42 mounted on said shaft intermediate the armature 41 and the washer 38 is connected in the usual manner to the armature windings.

Commutator 42 comprises a central sleeve 43 internally threaded and engaging a correspondingly threaded portion 44 on the shaft 37. Said commutator is of the face type, the segments thereof being carried by a mass of dielectric material 42' secured to the sleeve 43. The armature windings are connected to nibs 45 distributed around the outer edge of the commutator.

The form of the commutator 42 as shown in the drawings, lends itself to economical manufacture by mass production methods. A metal plate 46, having a central aperture is formed with an outer cylindrical flange 47 which carries the nibs 45. The edges of the central aperture are flanged in a manner suitable for anchoring the plate 46 in a mass of molded plastic dielectric material 42'. A plurality of radial slots 48 extend partway from the edge of central aperture across the face of said plate. The plate is molded with a mass of moldable plastic resin such as Bakelite together with the sleeve 43, the Bakelite surrounding the flanged edge of the central aperture and extending into the radial slots 48. After molding, certain of the slots 48 are extended by cutting away the metal to form grooves 48' as shown in Fig. 8, whereby the plate is divided into a series of separate segments.

In assembling the commutator 42 with the shaft 37, a dielectric washer 49 forming a backing for the commutator may be interposed between the latter and the armature 41, the connections from the armature windings being carried over the peripheral surface of said washer and connected to the nibs 45.

A plate 50 of insulating material such as paper-base Bakelite, is formed with a central aperture to fit over the shaft 37 adjacent the commutator 42. Plate 50 is supported by screws 51 engaging threaded bosses 52 secured, for instance by welding, to the inner surface of the semi-ovate casing section 20a.

The plate 50 carries the switch assembly, brush assembly and a support for one of the power leads for connecting the motor to a source of electric power. All of these motor parts are assembled with the plate 50 before installing it in the motor casing. Thus the assembly thereof is rendered highly convenient and economical. As shown in the drawings, only two screws are required for the final installation of the plate.

A pair of commutator brush holders 53 and 53' are mounted on the plate 50. These brush holders are formed from a flat piece of resilient sheet metal, for instance by suitable stamping processes. Essentially, each of the brush holders comprises a pair of U-shaped portions, the ends of the outer legs of which are provided with means for securing the brush holder to the supporting plate 50, and the ends of the inner legs of which are joined by a bridge having means at its center for holding a brush which extends outward substantially at right angles to the plane of the brush support. The flat U-shaped portions of the brush support provide means for resiliently urging the brush into contact with the face of the commutator 42.

Preferably, means for holding the brushes 54 and 54' are formed by a number of flanges and tabs bent outward from the central or transverse bridge portions of the brush supports, whereby the latter may be entirely formed from one piece of metal.

The ends of the brush supports 53 and 53' are secured for instance, by eyelets 55 to preformed apertures adjacent opposite edges of the plate 50 so that the brushes 54 and 54' will be supported to contact the face of the commutator 42 on opposite sides of the shaft 37. Before installation, the brush supports may be slightly bent so that the brush holders are forwardly extended from the surface of the plate 50, as indicated in Fig. 5, resilient contact of the brushes with the commutator thus tending to retain the brush normal to the commutator surface. The brush supports also provide an electrical connection with the brushes.

Use of the hereindescribed brush supports avoids the necessity of providing separate springs for urging the brushes against the commutator, thus constituting a feature whereby the cost of the motor and its assembly are materially lowered, and also avoid the necessity of providing separate connections to the brushes, which are easily snapped off or otherwise damaged.

One pair of eyelets 55, namely those which secure brush holder 53 to the plate 50, are also used to fasten a support 56 to the said plate for one of the power leads 57, which enter the side of the casing section 20a through an aperture provided with a suitable insulating bushing 58 adjacent to said support. The support 56 comprises a substantially T-shaped metal plate, the transverse portion of the T being bent at substantially right angles to the upright portion thereof. The said transverse portion is secured by eyelets 55 to the plate 50 and the upright portion extends outward substantially at right angles to the said plate. The outer end of the extended portion is bent downward and is provided with an aperture 56a through which the leads 57 extend. As indicated in Fig. 1, the lead 57 is connected to one end of the field winding coil 25. The support 56 effectively prevents any portion of the said electric connection to the field winding from coming in contact with the whirling armature or commutator and thus prevents damage which might result from such contact.

The other power lead 57' also enters the casing through the insulating bushing 58, and is connected to the brush support 53, for instance by soldering to one of the eyelets 55 carrying said brush support.

The opposite pair of eyelets 55, which carry brush support 53', are utilized to support a switch contactor for starting and stopping the motor. The switch support comprises a substantially T-shaped metal plate 59, the transverse portion of which is bent at right angles to the upright portion as shown in Fig. 1. The said transverse portion is fastened by the said pair of eyelets 55 to the plate 50, forming electrical contact with the brush support 53'. The upright portion of the metal plate 59 extends substantially at right angles to the plate 50, toward the field structure or armature of the motor, below an elongated rectangular aperture 60 in the wall of the casing section 20a.

A resilient switch contact strip 61 is secured to the end of the extended portion of metal plate 59 by means of an eyelet 62 carried in an aperture in the end of said extension by a pair of insulating washers 63 which normally insulate the said contact strip and eyelet from the metal support 59.

The switch, which is provided for starting and stopping the motor, is positioned in the elongated rectangular aperture 60 in the side of the motor casing 20a. For operation, the said switch is adapted to slide in the aperture 60 in a direction lying in an axial plane of said casing. The switch comprises a body portion 64 of dielectric material, preferably having an upper surface which fits the ovate curvature of the casing section 20a so that it may slide freely thereon. A finger piece 65 extends from the center of the body 64 of the switch through the aperture 60 in the said casing section.

The underside of the switch body 64 is longitudinally grooved, the said groove engaging one end of the resilient contact strip 61, the latter being bent in such a manner as to urge the switch body 64 resiliently against the inner surface of the casing 20. The other end of the contact strip 61 engages the opposite end of the lower surface of the switch body 64, the said end extending outwardly adjacent above the metal plate 59. A shoulder 66 on a lower surface of the switch body 64 is adapted, when the latter is moved to the left in the aperture 60 (referring to Fig. 1), to depress the left-hand end of the contact strip 61, causing it to form an electric contact with the metal plate 59, and thus with the brush holder 53' and brush 54'.

The free end of the field winding 25 is permanently connected to the contact strip 61, for instance by soldering it to eyelet 62.

The circuit of the motor when the switch is engaged, may be traced as follows: from lead 57 through field winding 25 to contact strip 61, through metal plate 59, brush holder 53' and brush 54' to one side of the commutator 42, through the armature winding to the other side of said commutator, and through brush 54 and brush holder 53 to the opposite lead 57'. Motion of the switch body 64 to the right (referring to Fig. 1) interrupts the circuit between contact strip 61 and metal plate 59 for stopping the motor.

A variation of the motor switch is shown in Fig. 14. In this construction, a substantially T-shaped metal plate 59a, having a shorter upright extension than the metal plate 59, is similarly attached by eyelets 55 to the plate 50 and forms an electric connection with the brush holder 53'. A plate of insulating material 67 secured to the lower surface of the upright extension of the metal plate 59a protrudes beyond the end of the latter, and carries an L-shaped metal strip 68, one end of which is spaced apart from the end of the metal piece 59a. The switch comprises a body 64a and a finger piece 65a supported in the rectangular aperture 60 in the wall of the motor casing 20 in a manner similar to the switch hereinbefore described. The lower surface of the switch body 64a is provided with a bore 69 extending upward into the finger piece 65a, and a metal contact plunger 70 mounted to slide in said bore, is resiliently urged by a spring 71 to engage the metal piece 59a and the metal strip 68.

When the switch is moved to the right in aperture 60 (referring to Fig. 14) the plunger 70 forms an electric contact bridging the space between the metal plate 59a and the strip 68. When the switch is moved to the left, the connection between the said plate and strip is broken. The free end of the field winding 25 is attached to the strip 68. Hence, when the switch is moved to the right, the motor circuit is closed for operation, and when moved to the left, the circuit is interrupted to stop the motor.

A support for the motor may be provided comprising a metal pad 72 secured to one side of the motor casing 20. The said pad has an aperture 73 at one end to engage one side of a ball member 74 carried by a shaft 75. An L-shaped clamp member 76 engages the opposite end of the pad 72, and an aperture 77 near the free end of the clamp member 76 engages the other side of the ball member 74, forming a ball-and-socket joint therewith.

A bolt 78 extending through the midportion of the L-shaped member 76 is threaded into a tapped hole 79 in the pad 72. Upon tightening the said bolt, pad 72 and L-shaped member 76 are clamped against opposite sides of the ball member 74 to retain the motor in any desired position.

In the motor hereinbefore described, the provision of the novel field structure permits the use of a simple form of prefabricated field winding and provides simplified means for rigidly securing together the two parts of the motor casing.

The use of a face-type commutator and of the novel brush supports adapted to cooperate therewith economically utilizes the space provided by the streamlined semi-ovate casing, thus reducing the size of the motor to a minimum.

The form of the brush supports, hereinbefore described, renders the manufacture of these parts of the motor simple and economical and provides adequate resilient support for the brushes to urge them into contact with the face-type commutator.

The assembly of the various parts of the motor is convenient and economical and is especially adapted for mass production. The electric connections are adequately supported in such a manner that damage resulting from their displacement and contact with the moving parts of the motor is substantially prevented.

The parts of the motor may be readily demounted for replacement of the field windings, brushes, or brush holders, or for repair of electric connections.

Variations and modifications may be made within the scope of this invention and portions of the improvements may be used without others.

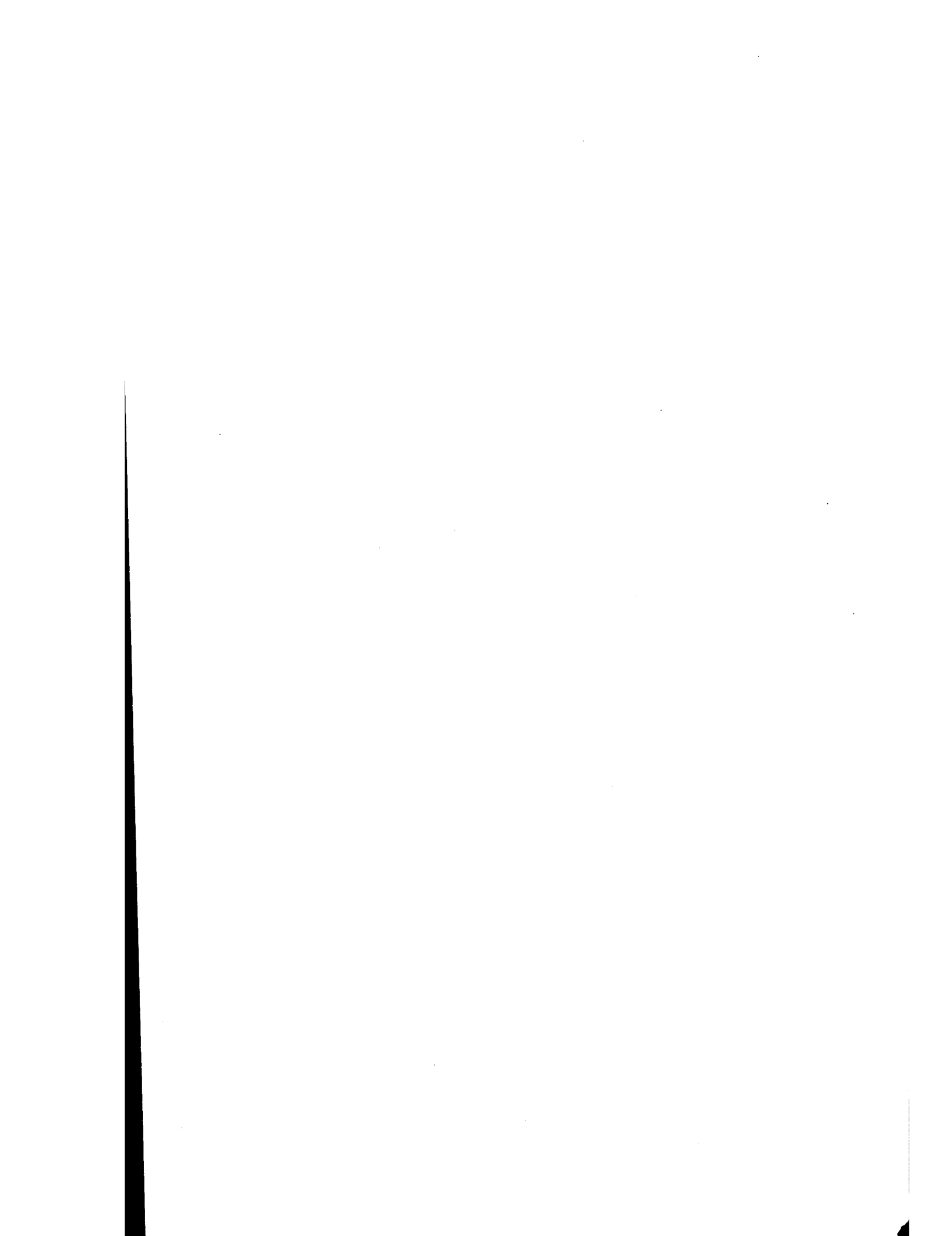

I claim:

1. In an electric motor comprising an armature and a shaft therefor, a field structure comprising an even-numbered plurality of pole pieces disposed at equally spaced intervals around the periphery of said armature; a transverse slot on one side of each pole piece, the slots of alternate pole pieces facing respectively toward opposite ends of said armature shaft; and a single field coil surrounding said armature, successive segments of said coil being disposed in the slots of the successive pole pieces.

2. In an electric motor comprising an armature and a shaft therefor, a field structure comprising a pair of pole pieces disposed on opposite sides of said armature; a transverse slot on one side of each pole piece, said slots facing respectively toward opposite ends of the said armature shaft; and a single field coil surrounding said armature, opposite segments of said coil being disposed in the slots of said pole pieces.

3. In an electric motor comprising an armature and a shaft therefor, a field structure comprising a pair of pole pieces disposed on opposite sides of said armature; a transverse arcuate slot on one side of each pole piece, said slots facing respectively toward opposite ends of said armature shaft, the center of curvature of said slots coinciding with the axis of said shaft; and a single annular field coil surrounding said armature, opposite segments of said coil being disposed in the arcuate slots of said pole pieces.

4. In an electric motor having an armature and a shaft therefor, a casing separable into sections along a line opposite the periphery of said armature; a pair of pole pieces disposed on opposite sides of said armature, said pole pieces bridging the line of separation of said casing sections, and means for securing each of said casing sections to each of said pole pieces whereby the casing sections are firmly fastened together.

5. In an electric motor comprising an armature and a shaft therefor, a casing separable into sections along a line opposite the periphery of said armature; a field structure comprising a pair of pole pieces disposed on opposite sides of said armature, one of said pole pieces being secured to one section of the casing, the other pole piece secured to the other section thereof, each of said pole pieces comprising a transverse slot on one side thereof facing outward from the casing section to which said pole piece is attached; a single field coil surrounding said armature, opposite segments of said coil being disposed in the slots of said pole pieces; and means for securing the casing sections together.

6. In an electric motor having an armature and a shaft therefor, a casing separable into sections along a line opposite the periphery of said armature; a pair of pole pieces disposed on opposite sides of said armature, one of said pole pieces being secured to one section of the casing and the other pole piece to the other section thereof, each of said pole pieces extending beyond the edge of the casing section to which it is attached; an arcuate slot in the side of each of said pole pieces facing outwardly from the casing section to which said pole piece is attached, the center of curvature of said slots coinciding with the axis of the said shaft; an annular field coil surrounding said armature, opposite segments of said coil being disposed in said arcuate slots; and means adjacent the edge of each of said casing sections opposite the pole pieces attached thereto for fastening said section to the protruding portion of the pole piece carried by the other section.

7. In an electric motor, a hollow casing, the rear end of which is of elongate, semi-ovate shape, the forward end being relatively flattened, said casing being separable into two sections intermediate the ends thereof; an armature carried by a rotary shaft which is supported by bearings at each end of the casing; a plurality of pole pieces supported by the casing disposed around the periphery of said armature, said pole pieces and armature being adjacent the forward end of the casing; a field winding for magnetizing said pole pieces; a commutator of the face type carried by said shaft on the side of the armature toward the rear end of the casing; and a brush assembly carried by a support secured to the casing between said commutator and the rear bearing of said shaft, the brushes thereof engaging said commutator in a resilient manner.

8. In an electric motor, a hollow casing, the rear end of which is of elongate, semi-ovate shape, the forward end being relatively flattened, said casing being separable into two sections intermediate the ends thereof; an armature carried by a rotary shaft which is supported by bearings at each end of the casing; a plurality of pole pieces supported by the casing disposed around the periphery of said armature; a transverse slot in the side of each of said pole pieces, the slots in alternate pieces facing respectively toward the forward and the rear ends of said shaft; a field coil surrounding said armature, successive portions of said coil being disposed in the lateral slots of said pole pieces; a commutator of the face type carried by said shaft on the side of the armature toward the rear end of the casing; and a brush assembly carried by a support secured to the casing between said commutator and the rear bearing of said shaft, the brushes thereof engaging said commutator in a resilient manner.

9. In an electric motor, a hollow casing, the rear end of which is of elongate, semi-ovate shape, the forward end being relatively flattened, said casing being separable into two sections along a line of separation adjacent the forward end thereof; an armature carried by a rotary shaft supported by bearings at each end of the casing, said armature being disposed opposite the line of separation of said casing; a pair of pole pieces supported by the casing disposed on opposite sides of the periphery of said armature, secured to the casing so as to bridge the line of separation of said casing sections, and providing means for fastening the casing sections together; a field winding for magnetizing said pole pieces; a commutator of the face type carried by said shaft on the side of the armature toward the rear end of the casing; and a brush assembly carried by a support secured to the casing between said commutator and the rear bearing of said shaft, the brushes engaging said commutator in a resilient manner.

10. In an electric motor, a hollow casing, the rear end of which is of elongate, semi-ovate shape, the forward end being relatively flattened, said casing being separable into two sections along a line of separation adjacent the flattened end thereof; an armature carried by a rotary shaft which is supported by bearings at each end of the casing and which protrudes through the forward end thereof, said armature being disposed opposite the line of separation of said casing sections; a pair of pole pieces disposed on opposite sides of the periphery of said armature, said pole pieces being secured respectively to the interior walls of the forward and rear casing sections, a portion of each pole piece protruding beyond the edge of the casing section to which it is attached; a transverse slot in the side of each of said pole pieces facing outward from the casing section to which the pole piece is attached; a field coil surrounding said armature, opposite portions of said coil being disposed in the lateral slots of said pole pieces; means adjacent the edge of each of said casing sections opposite the attached pole pieces for fastening the said sections to the protruding portion of the pole piece of the other section, whereby said sections are firmly secured together; a commutator of the face type carried by said shaft in the side of the armature toward the rear of said casing; and a brush assembly carried by a support secured to the casing between said commutator and the rear bearing of said shaft, the brushes engaging said commutator in a resilient manner.

11. In an electric motor, a hollow streamlined casing, the rear end of which is of an elongate, semi-ovate shape, the forward end being relatively flattened, said casing being separable into two sections, the line of separation between said sections being disposed adjacent the flattened end thereof; an armature carried by a rotary shaft supported by bearings at each end of said casing, said shaft protruding through the forward end of said casing and said armature being disposed opposite the line of separation of said casing sections; a pair of pole pieces disposed at opposite sides of the periphery of said armature, one of said pole pieces being secured to one casing section, the other pole piece to the other casing section and each of said pole pieces extending beyond the edge of the casing section to which it is attached; an arcuate slot in the side of each of said pole pieces facing outward from the casing section to which said pole piece is attached, the center of curvature of said slots coinciding with the axis of the armature shaft; an annular field coil surrounding said armature, opposite segments of said coil being disposed in the arcuate slots of said pole pieces; means adjacent the edge of each casing section opposite the attached pole pieces, for fastening said section to the protruding portion of the pole piece carried by the other section, whereby the sections of said casing are held securely together; a commutator of the face type carried by said shaft on the side of the armature facing the rear end of the casing; and a bridge assembly carried by a support secured to the casing between the rear bearing of said shaft and said commutator, the brushes engaging said commutator in a resilient manner.

12. In an electric motor, a hollow casing, the rear end of which is of elongate, semi-ovate shape, the forward end being relatively flattened, said casing being separable into two sections along a line of separation adjacent the forward end thereof; an armature carried by a rotary shaft supported by bearings at each end of the casing, said armature being disposed opposite the line of separation of said casing; a pair of pole pieces supported by the casing disposed on opposite sides of the periphery of said armature, secured to the casing so as to bridge the line of separation of said casing sections and providing means for fastening the casing sections together; an arcuate slot in the side of each of said pole pieces, said slots facing respectively toward opposite ends of said shaft, the center of curvature of said slots coinciding with the axis of the armature shaft; an annular field coil surrounding said armature, opposite segments of said coil being disposed in the arcuate slots of said pole pieces; a commutator of the face type carried by said shaft on the side of the armature toward the rear end of the casing; an insulating frame secured to the casing between said commutator and the bearing at the rear end of the motor; a pair of brush supports, each comprising a circuitous strip of resilient sheet metal, each end of which is secured to said frame and each of said supports comprising a brush-holding means intermediate the ends of said strip; and a pair of brushes carried by said brush supports resiliently engaging the face of said commutator on opposite sides of the armature shaft, the said brush supports tensioning the brushes against the commutator and providing an electrical connection with said brushes.

13. In an electric motor, a hollow casing, the rear end of which is of elongate, semi-ovate shape, the forward end being relatively flattened, said casing being separable into two sections along a line of separation adjacent the forward end thereof; an armature carried by a rotary shaft supported by bearings at each end of the casing, said armature being disposed opposite the line of separation of said casing; a pair of pole pieces supported by the casing disposed on opposite sides of the periphery of said armature, secured to the casing so as to bridge the line of separation of said casing sections and providing means for fastening the casing sections together; an arcuate slot in the side of each of said pole pieces, said slots facing respectively toward opposite ends of the armature shaft, the center of curvature of said slots coinciding with the axis of said shaft; an annular field coil surrounding said armature, opposite segments of said coil being disposed in the arcuate slots of said pole pieces; a commutator of the face type carried by said shaft on the side of the armature toward the rear end of the casing; an insulating frame secured to the casing between said commutator and the bearing at the rear end of the motor; a pair of brush supports secured to said frame comprising brush-holding means; a pair of brushes carried by said brush supports resiliently engaging the face of said commutator on opposite sides of the armature shaft; a switch contactor carried by said frame; and a switch member supported against the wall of said casing for operating said switch contactor to stop and start the motor.

14. In an electric motor, a hollow casing, the rear end of which is of elongate, semi-ovate shape, the forward end being relatively flattened, said casing being separable into two sections along a line of separation adjacent the forward end thereof; an armature carried by a rotary shaft supported by bearings at each end of the casing, said armature being disposed opposite the line of separation of said casing; a pair of pole pieces supported by the casing disposed on opposite sides of the periphery of said armature, secured to the casing so as to bridge the line of separation of said casing sections and providing means for fastening the casing sections together; an arcuate slot in the side of each of said pole pieces, said slots facing respectively toward opposite ends of said shaft, the center of curvature of said slots coinciding with the axis of the armature shaft; an annular field coil surrounding said armature, opposite segments of said coil being disposed in the arcuate slots of said pole pieces; a commutator of the face type carried by said shaft on the side of the armature toward the rear end of the casing; an insulating frame secured to the casing between said commutator and the bearing at the rear end of the motor; a pair of brush supports, secured to said frame, comprising brush-holding means; a pair of brushes carried by said brush supports resiliently engaging the face of said commutator on opposite sides of the armature shaft; a switch contactor carried by said frame; a switch member supported against the wall of said casing for operating said switch contactor to stop and start the motor; power leads for connecting said motor to a source of electric power; and means carried by said insulating frame for supporting said power leads against displacement in the interior of said casing.

JOSEPH YOUHOUSE.

Oct. 7, 1941.    J. R. MacKAY    2,258,575
LAMP CHANGING APPARATUS
Filed Feb. 15, 1938    2 Sheets-Sheet 1
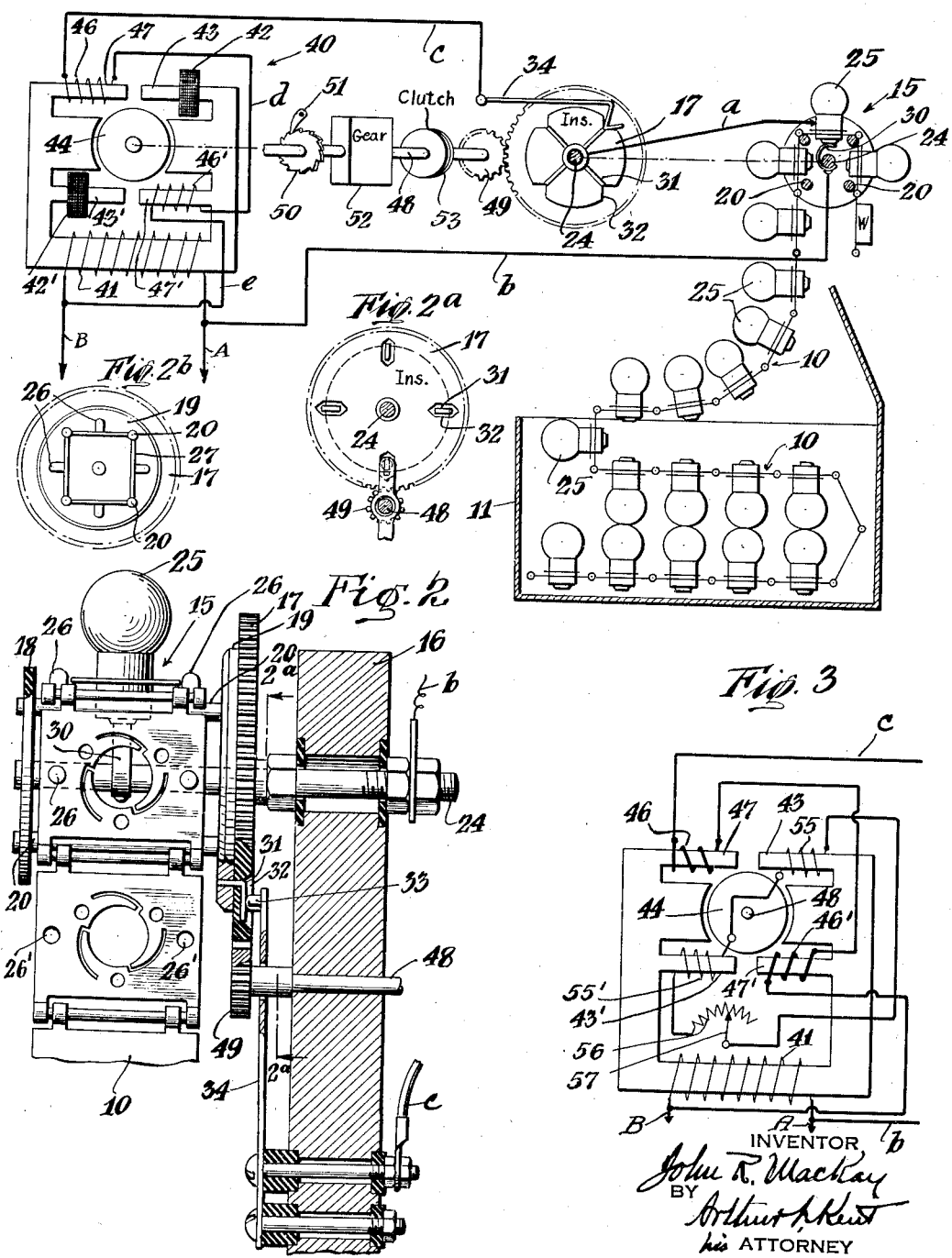
INVENTOR
John R. MacKay
BY
Arthur A. Kent
his ATTORNEY